May 27, 1958     O. W. RATCHFORD     2,836,696
WARMING OVEN FOR PLASTIC EYE GLASS FRAMES

Filed Oct. 3, 1955     3 Sheets-Sheet 1

INVENTOR.
Ottwell W. Ratchford
BY
Atty.

May 27, 1958  O. W. RATCHFORD  2,836,696
WARMING OVEN FOR PLASTIC EYE GLASS FRAMES
Filed Oct. 3, 1955  3 Sheets-Sheet 2

INVENTOR.
Ottwell W. Ratchford
BY
Truhlwells
Atty.

May 27, 1958     O. W. RATCHFORD     2,836,696
WARMING OVEN FOR PLASTIC EYE GLASS FRAMES

Filed Oct. 3, 1955     3 Sheets-Sheet 3

INVENTOR.
Ottwell W. Ratchford
BY
Truhlwells
Atty.

2,836,696

WARMING OVEN FOR PLASTIC EYE GLASS FRAMES

Ottwell W. Ratchford, Kennewick, Wash.

Application October 3, 1955, Serial No. 538,155

5 Claims. (Cl. 219—35)

The present invention relates to a warming oven for plastic eye glass frames.

In recent years it has become common practice to construct eye glass frames from plastic material. The usual method of constructing such frames is to mold the complete frame including the nose bridge and the lens holding portions as a single element. The bows which extend back over the wearer's ears are formed separately and hinged to the corners of the frame. Now since the facial structure of each wearer is different, these frames must be bent and fitted for each individual when his corrective lenses are mounted. In order to bend the frames, the person fitting them to the wearer's face must heat the plastic to a temperautre at which it becomes pliable. Usually physicans and optometrists maintain small hot plates or heated fluids for this purpose. The difficulty in using such devices for heating the frames is that the correct amount of heat cannot be localized sufficiently to heat only that part of the frame which requires reshaping. For example, if the nose bridge needs reshaping, the whole frame must be immersed in the heated fluid or exposed over the hot plate. The whole frame then becomes pliable and difficult to handle properly.

It is the principal purpose of this invention to provide a warming oven for eye glass frames which may be used to quickly heat any selected portion of the plastic frame without subjecting the remainder, or the operator's hands, to the heat.

A further purpose of the invention is to provide such an oven having an opening therein for insertion of plastic frames which spreads only enough to admit the frame in order to preserve the heat accumulated in the oven, and which automatically closes upon withdrawal of the frame.

The nature and advantages of my invention will appear more clearly from the following description and the accompanying drawings, wherein the preferred forms of the invention are shown. It should be understood, however, that the drawings and description are illustrative only, and are not intended to limit the invention except insofar as it is limited by the claims.

Figure 1:
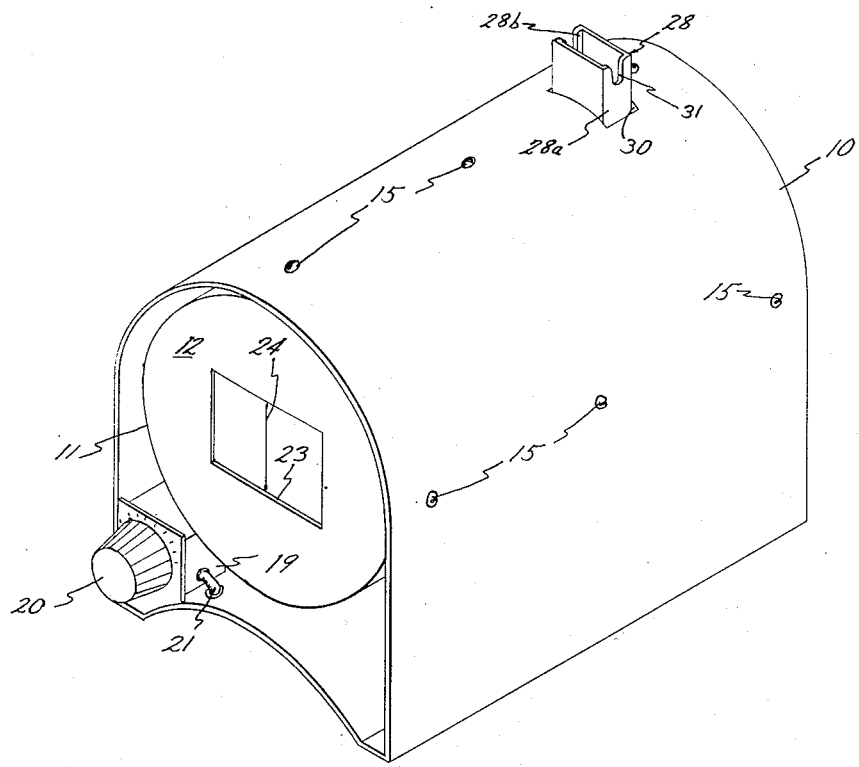
Figure 1 is a perspective view of my invention.
Figure 2:
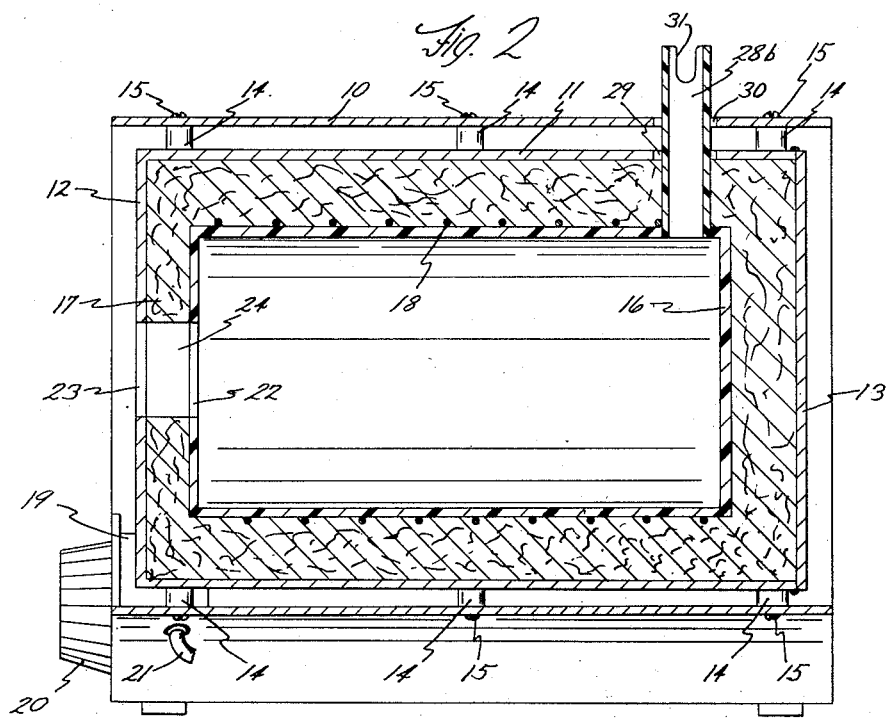
Figure 2 is a longitudinal sectional view through the oven shown in Figure 1.

Referring now to the drawings and to Figures 1 and 2 in particular, my improved oven comprises an outer shell 10 which has side, top and bottom walls, but which has its ends open to permit free passage of air through it. Inside the outer shell 10, a metal cylinder 11 is positioned. The cylinder 11 has end walls 12 and 13 thereon so as to enclose the space within. The cylinder 11 is spaced inwardly from the walls of the shell 10 and is mounted within the shell 10 on spacers 14. The spacers 14 are secured to the shell 10 by screws 15. The spacers 14 are of a heat insulating material, so that heat developed within the cylinder 11 is not conducted to the outer shell 10. The airspace between the cylinder 11 and the shell 10 also serves as insulation. With this construction, the shell 10 is maintained cool when the oven is on so as to protect the user against burns while operating the device.

Inside the enclosed cylinder 11, a considerably smaller heating cylinder 16 is positioned. The heating cylinder 16 is supported within the cylinder 11 by a thick layer of insulation indicated by the numeral 17. The cylinder 16 is shown as constructed of a thermoplastic material, but any material that will withstand heat may be used. In order to heat the interior of the cylinder 16, a length of relatively high resistance wire 18 is wrapped around the circumference of the cylinder 16. When current is passed through this wire 18, the heat developed is conducted through the walls of the cylinder 16 and to the airspace therein. The ends of the wire 18 are connected to a temperature regulating device 19 mounted on the outer shell 10. The temperature regulator may be any mechanism which will maintain the temperature within the cylinder 16 at a level determined by setting the dial 20. Such devices are old and well known and the particular construction thereof forms no part of this invention. A power cord 21 is provided to conduct electric power to the regulator 19.

At one end of the heating cylinder 16, an opening 22 is provided. A similar opening 23 is formed in the end wall 12 of the cylinder 11. The insulation 17 between these openings 22 and 23 is not removed, but merely slotted as indicated at 24 in Figures 1 and 2. The insulation 17 must be of a yielding nature such as the commonly used fiber glass so that when entry into the heating cylinder 16 is desired, the slot 24 may be forced open.

Figure 3:
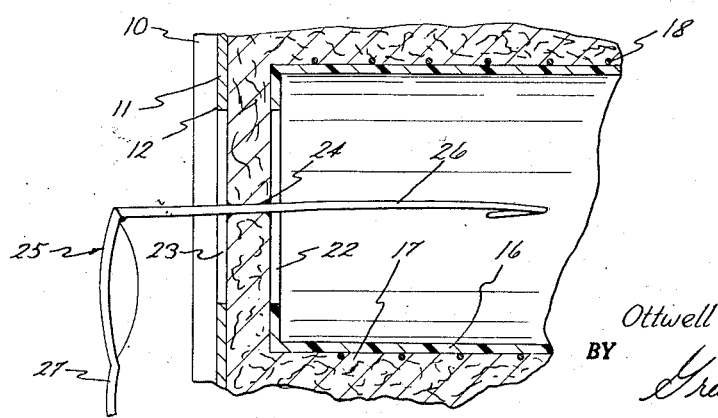
Figure 3 is a fragmentary sectional view taken on the line 3—3 of Figure 2 and illustrating a plastic bow inserted into the oven.
Figure 4:
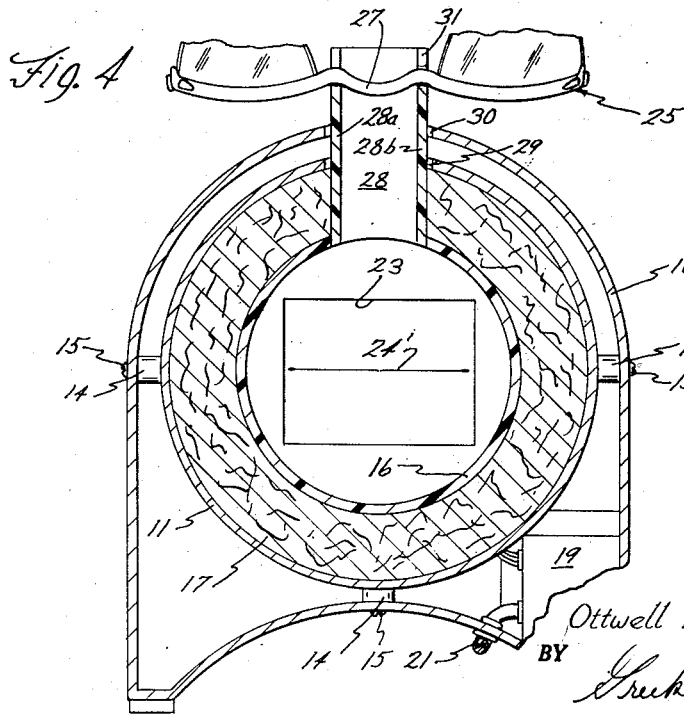
Figure 4 is a sectional view taken substantially on the line 4—4 of Figure 2 but showing a modified frame insertion opening.

A plastic eye glass frame to be reshaped is indicated generally at 25 in Figures 3 and 4. The frame 25 has bows 26 and a nose bridge 27, each of which usually must be heated and shaped to the wearer's face. The slot 24 is adapted for heating of the bows 26 or of the corners of the frame 25. The member to be heated, as for example the bow 26 shown in Figure 3, is pushed through the slot 24 into the heating cylinder 16. The insulation 17 forms around the bow 26 and prevents unnecessary heat loss and protects the operator's hand from burns. When the bow 26 is warm enough to be pliable, it is withdrawn and the slot 24 closes. The slot 24 may, of course, be vertical as shown in Figures 1, 2 and 3, or may be horizontal as shown at 24' in Figure 4.

When the nose bridge 27 is to be heated, it is not practical to admit the frame 25 to the cylinder 16 through the slot 24 or 24' since the whole frame would be exposed to the heat. In order to heat the bridge 27 only, a chimney 28 is provided. The chimney 28, best shown in Figures 2 and 4, is a tubular element which extends upwardly from the cylinder 16 through the cylinder 11 and the shell 10. Apertures 29 and 30 are formed in the cylinder 11 and shell 10 to allow the chimney 28 to pass. As may be seen, the apertures 29 and 30 are somewhat longer than the chimney 28 so as to prevent heat conduction from the chimney to the cylinder 11 and shell 10.

The transverse dimension of the chimney 28 is approximately equal to the distance between the lenses of a standard pair of glasses. A notch 31 is formed at the top of each of the side walls 28a and 28b of the chimney 28 to receive an eye glass frame 25 as shown in Figure 4. To heat the bridge 27, the frame is inverted and slipped into the notches 31, with the bridge 27 resting in the opening of the chimney 28. Heat passing up through the chimney 28 is communicated to the bridge 27 and makes it pliable for reshaping. With this construction, the bridge 27 may be heated without heating the remainder of the frame 25. It should be understood, however, that any selected portion of the frame 25 or bows 26 may be placed in the chimney opening for heating.

Figure 6:
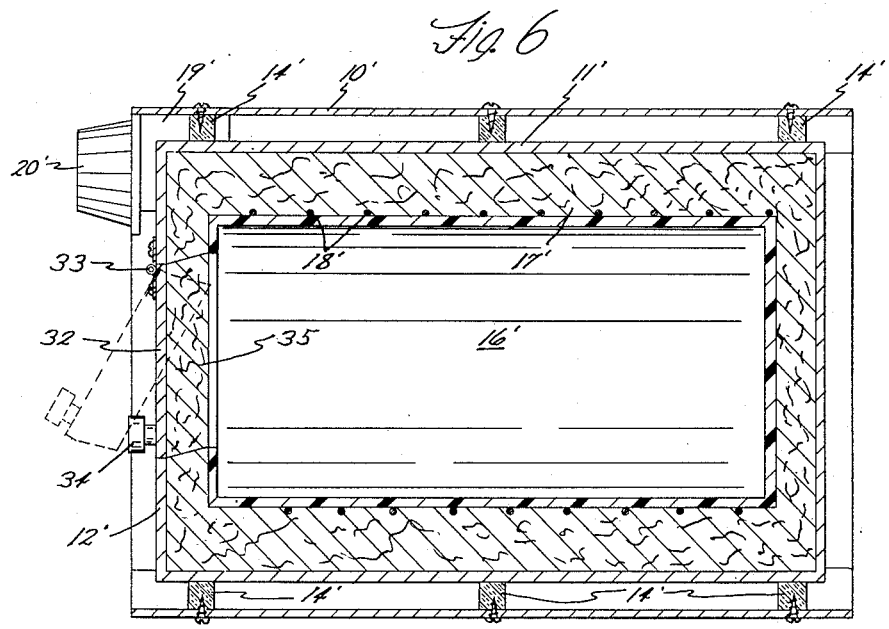
Figure 6 is a sectional view taken on the line 6—6 of Figure 5.
Figure 5:
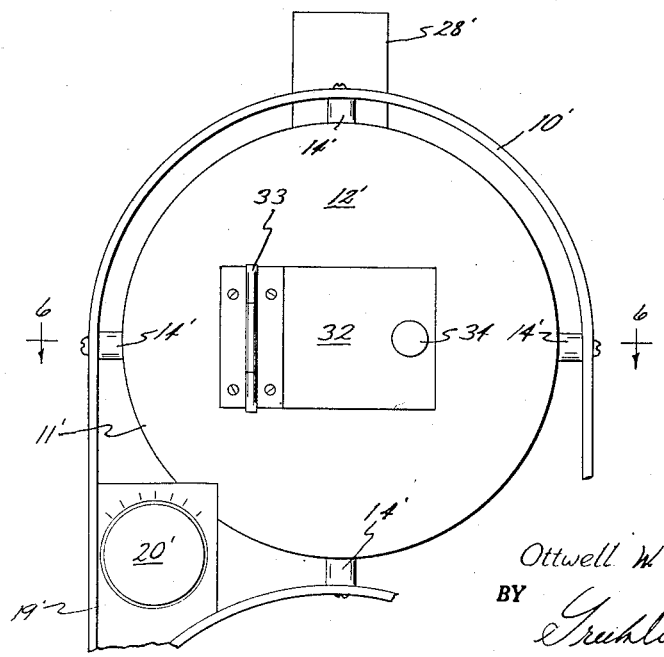
Figure 5 is an end elevational view of the oven showing a further modification of the frame insertion opening.

A slightly modified form of the invention is shown in Figures 6 and 7. In this form, as in the main form, the oven is comprised of an outer shell 10', a cylinder 11' mounted on spacers 14' inside the shell 10', a heating cylinder 16' within the cylinder 11', and insulation 17' between the cylinders 11' and 16'. However, a different type of opening is provided to permit entry into the cylinder 16'. A door 32 is cut in the end wall 12' of the cylinder 11' and mounted to the wall 12' by a hinge 33. A knob 34 is provided to open the door 32. As shown in Figure 6, the door 32 includes a layer of insulation 35, so that when it is closed the cylinder 11' is as completely insulated as in the main form. With the construction shown in Figures 5 and 6, considerably more space is provided through which articles may be passed into the heating cylinder 16'. This form is adapted for use in heating more bulky objects as well as eye glass frames.

As may be seen from the foregoing description, my improved oven provides an efficient and safe means for heating any selected portion of a plastic frame for eye glasses while maintaining the remainder at a temperature below that at which it becomes pliable.

It is believed that the nature and advantages of my invention appear clearly from the foregoing description.

Having thus described my invention, I claim:

1. A warming oven for plastic eye glass frames comprising an outer shell having its opposite ends open to allow air passage therethrough, a housing mounted within said outer shell, said housing being substantially smaller than the shell and being spaced inwardly therefrom, a heating chamber within said housing, insulating material surrounding said chamber, a heating element within said housing for heating the interior of the chamber, temperature regulating means connected to said element, an opening in one end of said housing, the insulating material adjacent the opening having a slot therein, said insulating material being of a resilient nature whereby to allow the slot to be widened for insertion of eye glass frames therethrough, and a chimney extending upwardly from the chamber through the housing and the outer shell for heating small selected portions of eye glass frames held thereover.

2. A warming oven for plastic eye glass frames comprising an outer shell having its opposite ends open to allow air passage therethrough, a cylinder mounted within the shell, said cylinder being substantially smaller than the shell and being spaced inwardly therefrom, insulating posts securing the cylinder within the shell, said cylinder having end walls thereon, a heating cylinder having end walls positioned within the first named cylinder, insulating material within the first named cylinder and surrounding the heating cylinder, a heating wire wrapped around the outer surface of the heating cylinder and being electrically connected to a temperature regulator mounted on the oven, power leads connected to said regulator for supplying electrical power thereto, an aperture in one of the end walls of said first named cylinder, an aperture in the adjacent end wall of said heating cylinder, the insulating material between said walls having a slot therein to permit access into the heating cylinder, and a chimney extending upwardly from said heating cylinder through the first named cylinder and through the outer shell.

3. A warming oven for plastic eye glass frames comprising an outer shell having its opposite ends open to allow air passage therethrough, a cylinder mounted with the shell, said cylinder being substantially smaller than the shell and being spaced inwardly therefrom, insulating posts securing the cylinder within the shell, said cylinder having end walls thereon, a heating cylinder having end walls positioned within the first named cylinder, insulating material within the first named cylinder and surrounding the heating cylinder, a heating wire wrapped around the outer surface of the heating cylinder and being electrically connected to a temperature regulator mounted on the oven, power leads connected to said regulator for supplying electrical power thereto, an aperture in one of the end walls of said first named cylinder, an aperture in the adjacent end wall of said heating cylinder, the insulating material between said walls having a slot therein to permit access into the heating cylinder, and a chimney extending upwardly from said heating cylinder through the first named cylinder and through the outer shell, said chimney having a pair of notches at its upper end to receive and support frames for heating.

4. A warming oven for plastic eye glass frames comprising an outer shell having its opposite ends open to allow air passage therethrough, a cylinder mounted with the shell, said cylinder being substantially smaller than the shell and being spaced inwardly therefrom, insulating posts securing the cylinder within the shell, said cylinder having end walls thereon, a heating cylinder having end walls positioned within the first named cylinder, insulating material within the first named cylinder and surrounding the heating cylinder, a heating wire wrapped around the outer surface of the heating cylinder, power leads connected to said heating wire for supplying current thereto, an aperture in one of the end walls of said first named cylinder, an aperture in the adjacent end wall of said heating cylinder, the insulating material between said walls having a slot therein to permit access into the heating cylinder, and a chimney extending upwardly from said heating cylinder through the first named cylinder and through the outer shell, said chimney having a pair of notches at its upper end to receive and support frames for heating.

5. A warming oven for plastic eye glass frames comprising a housing, a heating chamber within said housing, insulating material surrounding said chamber, a heating element within said housing for heating the interior of the chamber, an opening in one end of said housing, the insulating material covering said opening and having a slot therein adjacent the opening, and said insulation material which covers the opening being of a resilient nature whereby to allow the slot to be widened for insertion of eye glass frames therethrough.

References Cited in the file of this patent

UNITED STATES PATENTS

| 787,584 | Matteson | Apr. 18, 1905 |
| 1,294,269 | Hopkins | Feb. 11, 1919 |
| 1,541,375 | Neuwirth | June 9, 1925 |
| 2,661,645 | Heath | Dec. 8, 1953 |
| 2,710,331 | Stegeman | June 7, 1955 |
| 2,729,735 | Fries | Jan. 3, 1956 |

FOREIGN PATENTS

| 21,879 of 1897 | Great Britain | Sept. 11, 1897 |
| 513,684 | Great Britain | Oct. 19, 1939 |
| 517,364 | Great Britain | Jan. 26, 1940 |